US009130966B2

(12) United States Patent
Chitturi et al.

(10) Patent No.: US 9,130,966 B2
(45) Date of Patent: Sep. 8, 2015

(54) SYSTEM AND METHOD FOR ACCESS AND COMMUNICATION BETWEEN A CONVERGED NETWORK-BASED ADDRESS BOOK SYSTEM AND A USER DEVICE

(75) Inventors: Suresh Chitturi, Irving, TX (US); Brian Edward Anthony McColgan, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 1015 days.

(21) Appl. No.: 12/561,424

(22) Filed: Sep. 17, 2009

(65) Prior Publication Data

US 2010/0077027 A1    Mar. 25, 2010

Related U.S. Application Data

(60) Provisional application No. 61/097,745, filed on Sep. 17, 2008.

(51) Int. Cl.
| | |
|---|---|
| *G06F 15/16* | (2006.01) |
| *G06F 7/00* | (2006.01) |
| *H04L 29/08* | (2006.01) |
| *H04L 29/12* | (2006.01) |

(52) U.S. Cl.
CPC ........ *H04L 67/1095* (2013.01); *H04L 61/1594* (2013.01); *H04L 67/02* (2013.01); *H04L 67/125* (2013.01); *H04L 67/24* (2013.01); *H04M 2203/554* (2013.01)

(58) Field of Classification Search
CPC ........... H04L 61/1594; H04L 67/1095; H04M 2203/554

USPC .......................................................... 709/203
See application file for complete search history.

(56) References Cited

U.S. PATENT DOCUMENTS

| | | | |
|---|---|---|---|
| 6,996,816 B1 | 2/2006 | Bohan | |
| 2004/0052356 A1* | 3/2004 | McKinzie et al. | ....... 379/355.02 |
| 2005/0177788 A1 | 8/2005 | Snyder | |

(Continued)

FOREIGN PATENT DOCUMENTS

| | | |
|---|---|---|
| KR | 100400832 B1 | 9/2003 |
| WO | WO 2011/108844 A2 | 9/2011 |

OTHER PUBLICATIONS

International Search Report; PCT/US09/57265; Jan. 26, 2010.

(Continued)

*Primary Examiner* — Emmanuel L Moise
*Assistant Examiner* — Xiang Yu
(74) *Attorney, Agent, or Firm* — Conley Rose, P.C.; J. Robert Brown, Jr.

(57) ABSTRACT

A method of sharing contacts within a converged address book system having a converged address book server, the method receiving from a requestor, at the converged address book server, a request for a contact to be shared with a recipient identified in the request; obtaining contact information for the contact from a repository; and delivering the shared contact to the recipient. Also, a method for interaction with a legacy address book system from a network based converged address book system, the method receiving a request to import legacy address book data from a legacy address book system; contacting the legacy address book system and supplying access parameters; retrieving data from the legacy address book system; and storing the imported data in a network based address book storage.

15 Claims, 10 Drawing Sheets

(56) References Cited

U.S. PATENT DOCUMENTS

| | | | |
|---|---|---|---|
| 2005/0243993 A1* | 11/2005 | McKinzie et al. | 379/355.04 |
| 2007/0038720 A1 | 2/2007 | Reding | |
| 2007/0223683 A1* | 9/2007 | Pearson | 379/355.01 |
| 2008/0307090 A1 | 12/2008 | Pearson | |
| 2009/0160694 A1* | 6/2009 | Di Flora | 341/176 |
| 2009/0182821 A1 | 7/2009 | Allen et al. | |
| 2009/0233591 A1* | 9/2009 | Zhu et al. | 455/418 |
| 2009/0298489 A1 | 12/2009 | Chitturi et al. | |
| 2010/0082761 A1 | 4/2010 | Nguyenphu et al. | |
| 2010/0088276 A1* | 4/2010 | Mostafa | 707/636 |
| 2011/0093577 A1* | 4/2011 | Lee et al. | 709/223 |
| 2011/0153760 A1 | 6/2011 | Fan et al. | |
| 2011/0252091 A1 | 10/2011 | Chitturi | |
| 2014/0108518 A1* | 4/2014 | D'Angelo et al. | 709/203 |

OTHER PUBLICATIONS

Written Opinion of the International Searching Authority; PCT/US09/57265; Jan. 26, 2010.

International Searching Authority, the corresponding International Search Report and Written Opinion dated Feb. 1, 2010, of Application No. PCT/US2009/057265.

International Searching Authority, the corresponding International Preliminary Report on Patentability dated Oct. 5, 2010, of Application No. PCT/US2009/057265.

Open Mobile Alliance, "Converged Address Book Requirements", Draft version 1.0 dated Apr. 21, 2008, OMA-RD-CAB-V1_0-20080521-D.

Open Mobile Alliance, "Converged Address Book Requirements", Draft version 1.0 dated Jul. 15, 2008, OMA-RD-CAB-V1_0-20080715-D.

OMTP Hardware Working Group, "OMTP Hardware Requirements and Defragmentation: Trusted Environment OMTP TR0", Version 1_1, Release 1, dated Mar. 27, 2006. OMTP_Trusted_Environment_OMTP_TR0_v1.1.pdf.

Open Mobile Alliance Ltd., CR_Subscription_Invitation doc. Change Request, OMA-REQ-CAB-2008-0071, Mar. 21, 2008 (7pgs.).

Open Mobile Alliance Ltd., Converged Address Book Requirements, Candidate Version 1.0, OMA-RD-CAB-V1_0-20090907-C, Sep. 9, 2009 (23 pgs.).

Candian Office Action; Application No. 2,736,755; Jul. 29, 2013; 3 pages.

PCT International Preliminary Report on Patentability; Application No. PCT/US2009/057265; Oct. 5, 2010; 14 pages.

* cited by examiner

SYSTEM AND METHOD FOR ACCESS AND COMMUNICATION BETWEEN A CONVERGED NETWORK-BASED ADDRESS BOOK SYSTEM AND A USER DEVICE

CROSS-REFERENCE TO RELATED APPLICATIONS

The present application claims the benefit of U.S. Provisional Patent Application 61/097,745, filed Sep. 17, 2008, the entire disclosure of which is incorporated by reference herein.

FIELD OF THE DISCLOSURE

The present disclosure relates to a converged address book system, and in particular to access and communication interfaces, methods and operations between the user's device and the address book server for a converged address book system.

BACKGROUND

In a social context or setting, an address book is a useful tool for establishing social relationships between people. A typical address book contains a list of contact entries, with each contact entry comprising a list of contact information. Such information could include, but is not limited to, a name, physical address, email address, telephone number, personal identification number, instant messaging identifier, among others, which enables one user to contact another user. In addition to the contact entries, the address book system may also include a user's own personal contact information.

Growing innovation across services domain and mobile devices creates a number of ways to organize and manage contact information. With rapid growth in the usage of address books on end-user devices, the mobile industry has produced many different types of address book systems, associated data formats and protocols to manage the same. While this offers more choice to end users, it poses a very bad user experience and causes interoperability issues across differing address book applications. In other words, there is a lack of unified user experience and inconsistent user experience across devices with regard to address book applications, particularly for wireless mobile devices where optimization and efficiency of resources is important.

Several activities are under way within various standards organizations such as the Open Mobile Alliance (OMA) Converged Address Book (CAB), Open Mobile Terminal Platform (OMTP) and Internet Engineering Task Force (IETF), to provide a converged address book system. However, a gap currently exists in terms of defining an underlying system architecture and associated functionality that would permit users to manage (e.g. add, modify, delete), publish, subscribe, search, and share information as part of a converged address book system across various devices over a network. Interaction with legacy or external address book systems (e.g. importing data from other address book systems) is another key functionality of a standard converged address book system.

In particular a communication and access interface from the client to the server or network-based address book system is not specified. Current solutions are not optimal for a mobile device in terms of over-the-air (OTA) traffic and client complexity including memory footprint and data processing requirements. Existing solutions are also not adequate for dealing with requirements related to a converged address book system such as import data from legacy address books to converged address book system with user's request, searching for data stored in network data sources (e.g. XDM and non-XDM repositories), subscriptions to personal contact information of other users, and sharing contact information transparent to the user knowing the underlying techniques.

BRIEF DESCRIPTION OF THE DRAWINGS

The present disclosure will be better understood with reference to drawings in which.

DETAILED DESCRIPTION

The present disclosure provides a method of sharing contacts within a converged address book system that includes a converged address book server, the method comprising: receiving, at the converged address book server, a request for contact information to be shared with a recipient identified in the request, the recipient being different from a requestor that communicated the request; obtaining the contact information from a repository; and delivering the shared contact to the recipient.

The present disclosure further provides a method for initiating sharing of contacts within a converged address book system that includes a converged address book client, the method comprising: sending, from the converged address book client to a converged address book server, a request for contact information to be shared with a recipient identified in the request; and receiving, in response to the sending, a confirmation from the converged address book server.

The present disclosure still further provides a method for interaction with a legacy address book system from a network based converged address book system, the method comprising: receiving a request to import legacy address book data from a legacy address book system; contacting the legacy address book system and supplying access parameters; retrieving legacy address book data from the legacy address book system; and storing the legacy address book data in a storage associated with the network based converged address book system.

The present disclosure still further provides a method for initiating interaction with a legacy address book system from a network based converged address book system, the method comprising: requesting, from an address book client, importation of legacy address book data from a legacy address book system; and receiving, at the address book client, a notification to synchronize the address book client with a network based address book storage, wherein the notification to synchronize indicates that the network based address book system has imported legacy address book data.

The present disclosure therefore provides a method and system to define an interface between a user device and the network-based address book (NAB) system to communicate and access information from the network-based address book to the mobile device. This interface provides a consistent method to access and communicate necessary requests from the mobile device to the network-based address book system.

In addition, in one embodiment this interface will ease deployment of converged network-based address book systems, providing a low barrier to entry for existing legacy mobile devices while providing a seamless path for more advanced devices in the future.

Figure 1:
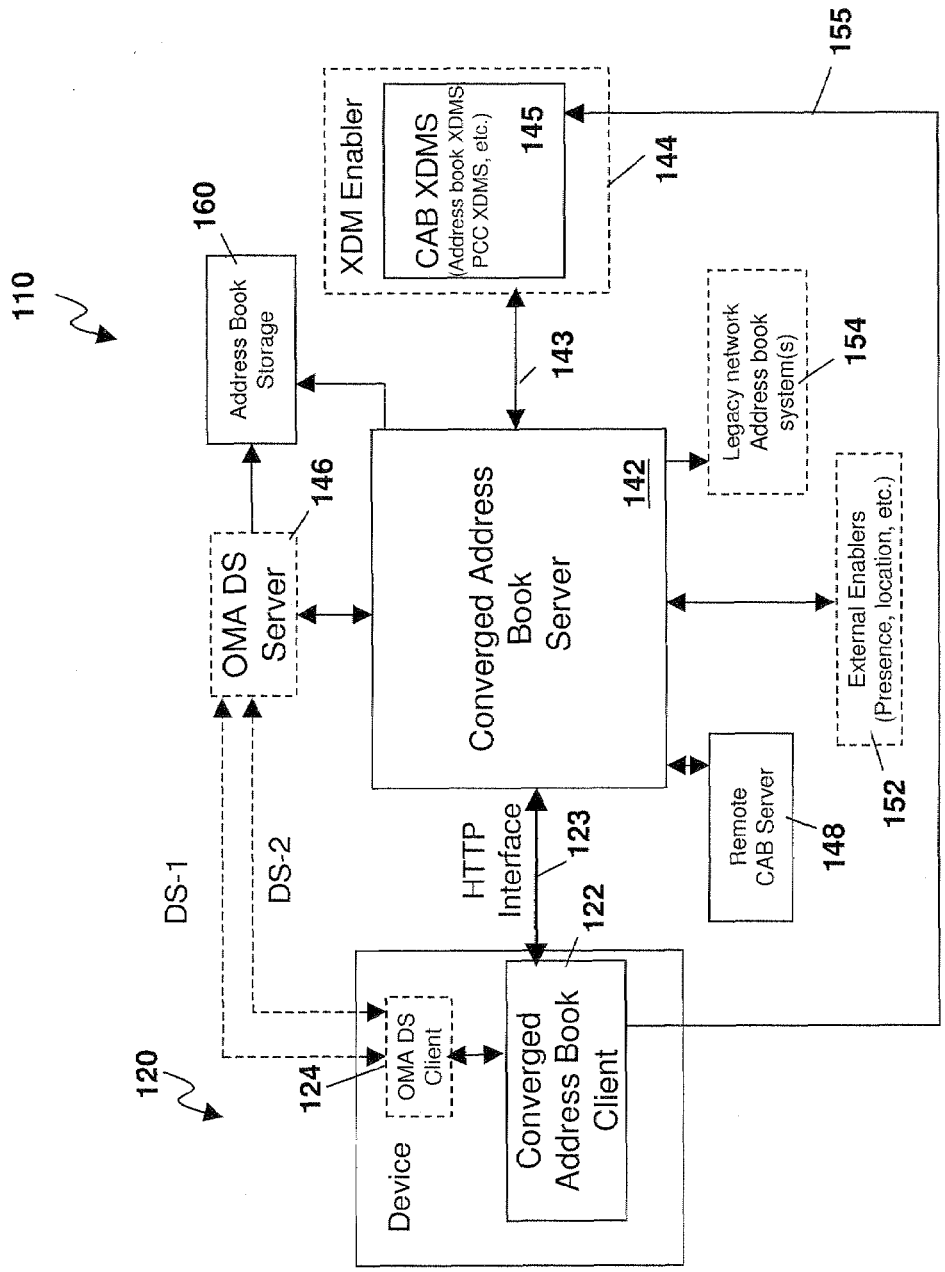
FIG. 1 is a block diagram illustrating an exemplary system architecture for a converged address book system.

Reference is now made to FIG. 1. FIG. 1 shows an exemplary system architecture for a network-based converged address book system. As is seen in FIG. 1, the system is divided into a network side 110 and a device side 120.

Device side 120 could be part of any device on which a converged address book might be used. Examples include wireless devices such as cell phones, personal digital assistants, two-way pagers or other such devices. Device side 120 could further include wired devices such as personal computers, laptop computers, set-top boxes, network entities acting on behalf of the user, among others.

Device side 120 includes a Converged Address Book (CAB) client 122. Address book client 122 is a principal functional entity on the device side 120. Address book client 120 communicates with the Address book server 142, as described below. Interface 123 between the address book client 122 and address book server 142 carries requests such as subscribe, search, share, and import, among others, from a user of the converged address book to the network side 110. One possible method to implement interface 123 between the address book client and the address book server is via a proxy model, for example storing the client requests in the CAB XDMS 145, (as shown by the interface 155) which are then retrieved by the address book server 142 (as shown by the interface 143).

In one embodiment, the underlying protocol for interface 123 between address book client 122 and address book server 142 is implemented using Internet Protocol (IP) protocols such as HyperText Transfer Protocol (HTTP) or Session Initiation Protocol (SIP). For those skilled in the art may understand that other protocols such as XCAP, SOAP, XML-RPC, or REST may be used as an alternative to or in combination with standard HTTP protocol. Further, in one embodiment the body or the payload of the protocol may contain the necessary syntax or protocol to convey the requests.

A further functional block on device side 120 includes the Open Mobile Alliance (OMA) Data Synchronization (DS) Client 124. The primary responsibility of the OMA DS Client 124 is to assist address book client 122 to synchronize a user's personal contact information and address book data between the device side 120 and the network side 110. In one embodiment this is accomplished using an OMA Data Synchronization (DS) server 146 in the network.

In one embodiment the underlying protocol used for synchronization can be HTTP or Wireless Application Protocol (WAP) PUSH. The notification message framework defined by OMA DS may be used as a mechanism for the notification of CAB information to the CAB user. For example, updates to contact information resulting from contact subscriptions, changes in a user's personal contact card information, CAB status of the users in the address book, among others, may be indicated through the notification.

Notifications may also be delivered through other mechanisms such as Short Message Service (SMS), Multimedia Message Service (MMS), email, instant messaging, SIP Notify, SIP Push, among others.

The interface between address book client 122 and OMA DS client 124 is responsible for necessary communication between the CAB client and SyncML client to synchronize the user's personal contact information and address book data between the device and network.

On network side 110, address book server 142 is the main component of the converged address book system.

Figure 2:
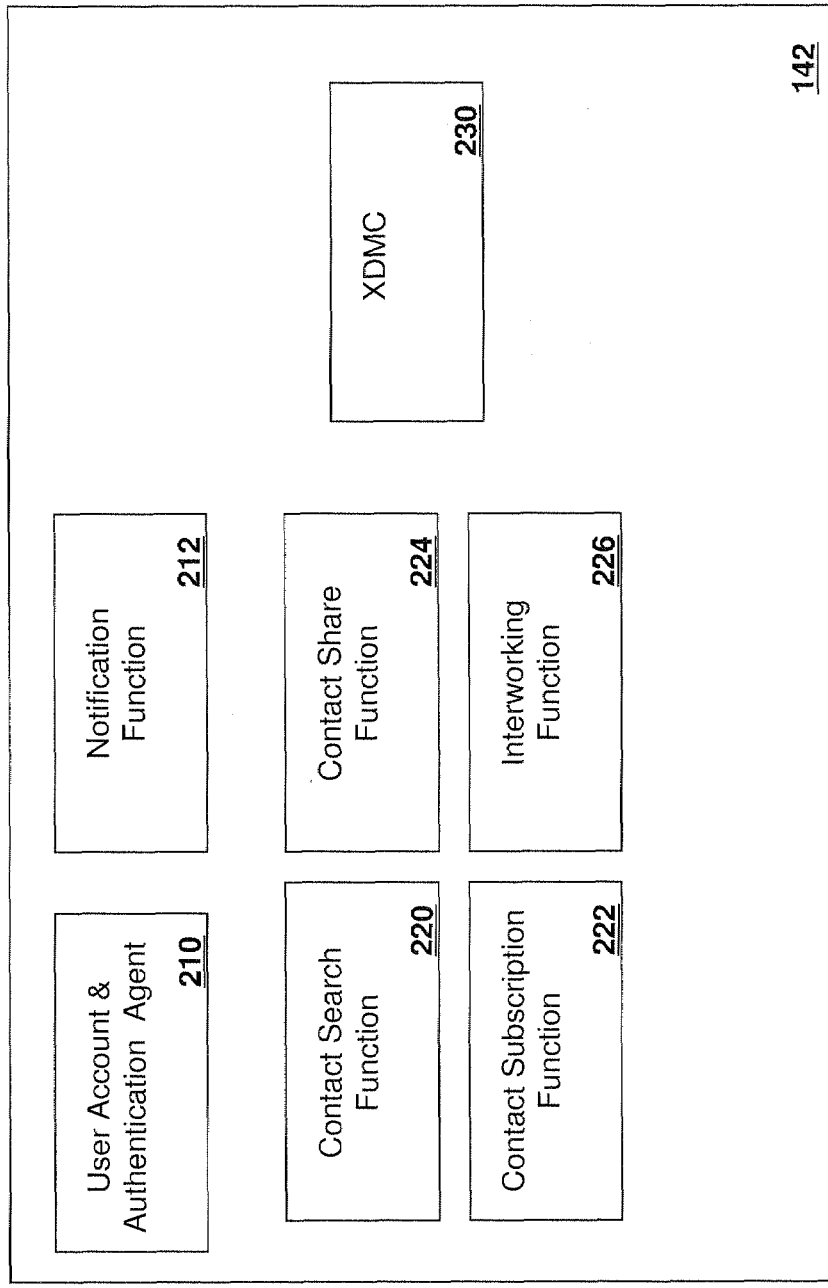
FIG. 2 is block diagram showing logical entities within an address book server or within the network.

Referring to FIG. 2, an address book server 142 may include one or more of the following functions.

User account manager and authentication agent 210: this agent is responsible for managing user authentication and account information including user preferences and custom aspects, such as configuration to synchronize only partial address book data from the server to the client, receive/not receive notifications, among others.

A notification function 212: The notification function is used to notify the client of updates in a subscribed contact. This function may use the DS notification framework or other mechanisms such as email, sms, Instant Messaging (IM), SIP NOTIFY, among others.

CAB XML Document Management Client (XDMC) 230: this client is responsible for the access and manipulation of address book data such as a personal contact card (PCC) and address book information stored in a CAB XDMS 145 database or a separate address book storage 160.

Contact Search Function 220, Contact Subscription Function 222, Contact Share Function 224 and Interworking Function 226 are intrinsic functions at address book server 142 to perform the network side operations of the interface, as described below with reference to FIGS. 3 to 7.

Referring again to FIG. 1, a further element on the network side 110 is the XML Document Management (XDM) Enabler 144. The XDM Enabler 144 includes CAB XML Document Management Server (XDMS) 145 that comprises of a personal contact card (PCC) XML Document Management Server (XDMS), which is a database containing all PCCs of users in the converged address book system; Address Book XML Document Management Server (XDMS), which is a network database representing users address book data; among others.

Alternatively, a further entity on network side 110 may include a Address Book Storage 160, which stores an address book for each user on the network. This storage can be synchronized with an address book client 122 on the device.

A further component on the network side 110 may be remote CAB servers 148. It is possible that CAB servers may be hosted in other network domains. The remote CAB server interface is an interface that permits interworking between trusted CAB systems in one or more network domains.

A further entity on network side 110 includes network based legacy address book systems 154. Legacy address book systems are address book systems that may already exist. For example, Facebook™, Outlook™, Yahoo!™ contacts, among others, may already exist on the network side. These legacy systems are used to manage personal contact and address book information and are also typically network based.

The above architecture could be utilized to provide a converged address book service among various clients within a network. Functionality for such a converged address book would include subscribing to the contacts in the address book, publishing information and changes in information, synchronizing between a device and network, interaction with legacy systems, contact search, contact share, among other functionality. The above list is not meant to be exhaustive and other functionality for a converged address book architecture or service may be implemented.

Regarding the interface between the address book server 142 and device side 120 and also between the address book server 142 and the XDM databases 144/145 and address book storage 160, the following is responsible for achieving a functionality of the converged network based address book system. In the present disclosure, the user device can either be a wireless device, such as a mobile device or it can be a wired device such as a personal computer.

The network based address book system mainly consists of two types of data: namely, a user's personal contact card and address book data which contains contact information regarding entities within a user's address book.

Present Open Mobile Alliance (OMA) client address book architecture documentation specifies four key functionalities. These include contact search, contact subscription, contact share and interaction with legacy address books. The present disclosure relates to implementing the above functions.

While the examples below are illustrated with regard Internet protocol (IP) based protocols, such as hypertext transfer protocol (HTTP), in other embodiments a protocol such as SIP or proprietary protocols could instead be used. The present disclosure is not meant to be limited to HTTP and extensible markup language (XML) and the use of proprietary or SIP based protocols with an appropriate payload may be employed. In a further embodiment, the same XML payload from the present disclosure may be used to transport the request data over other protocols such as SIP, among others.

One element of the interface is a definition of a payload for carrying requested data from a device or other user equipment to a network based server. The payload is, in one embodiment, interoperable with other document based systems and can, for example, be XML based. The use of XML allows the payload to be extensible and interoperable with other document based systems.

When XML is used, an associated MIME type and XML schema will also be defined for transporting XML documents or fragments over transport protocols such as HTTP. One such protocol method for requests is HTTP POST. The protocol methods supported may also include such as HTTP PUT, HTTP GET, among others.

The four interfaces—Contact Search; Contact Subscribe; Contact Share; and Interaction with Legacy Address Book systems are described below.

Contact Search

The converged address book enabler aims to provide a mechanism to search for contact information. It allows the converged address book users to search for the contact information from within the host converged address book system, remote converged address book system and/or external databases made available by a service provider such as, for example, Yellow Pages™. The contact information made available for search operations is subject to a converged address book user's authorization rules and a service provider's policies.

Figure 3:
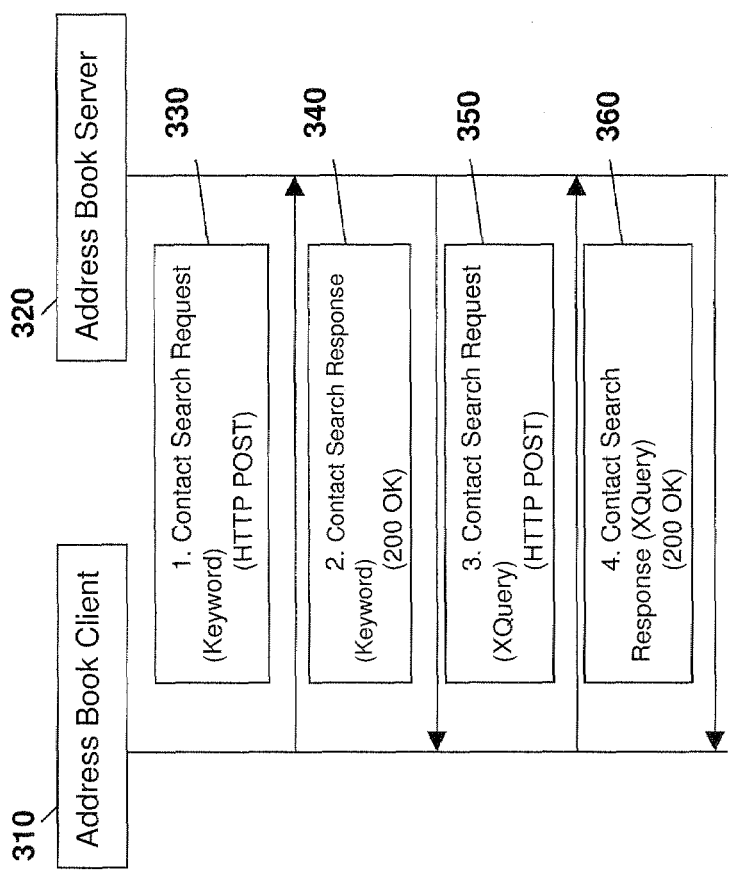
FIG. 3 is a flow diagram illustrating a contact search data flow.

Reference is now made to FIG. 3. FIG. 3 shows an address book client 310 and address book server 320.

In order for an address book client 310 to perform a contact search of address book server 320, a request needs to be made. Various requests would be known to those in the art, and two examples include a simple keyword search and a complex XQuery search.

A simple keyword search model allows the address book user to query a network address book by utilizing simple keywords. An exemplary search interface is:

```
<ContactSearch>
    <----------------------data for search request or response goes here
</ContactSearch>
```

For a simple keyword search, this can be expanded to:

```
<ContactSearch>
    <Request id="a1234" maxResults="50">
        <Keyword caseSensitive="true">example </Keyword>
    </Request>
</ContactSearch>
```

In the above, <Contact Search> is the root node of the search document which is converged to both the search request from the client to the server and the search response back from the server to the client. A <ContactSearch> element can contain either <Request> or <Response> element(s).

<Request> is a container element which contains the search request data in XML. The Request element can contain either the <Keyword> element or the <Query> element.

The element contains an attribute "maxResults" which defines the maximum number of results that can be returned and is of type integer. As will be appreciated, if no such attribute is specified, the system can default to a default value for the maximum or limitless number of results. In the example above, the maximum result is defined as 50 indicating that at most 50 results can be returned at which point the search cuts off the remaining response.

The element further contains the attribute "id", designating an identifier for the request. This may be used by the client to correlate search requests as the server will include the id-value in the corresponding result. This attribute is of type NCName.

The <Keyword> is the element that carries the actual search data. In other words, the keyword to search elements from the network address book system is described by this parameter. The data type of this element is a "String". This element contains an optional attribute 'caseSensitive' which indicates whether the search should be conducted in a case-sensitive manner or note. The type is a boolean with the following enumerands {"true", "false"}. In one embodiment the default value is "false".

The word "example" in the search above indicates the keyword that is being searched. Thus, for example, if the user was searching for all contacts within Dallas or with a link to Dallas then the keyword search could be based on the word "Dallas". At which point a list of results could be returned to the address book client 310.

In an alternative embodiment, a search could be performed against a specific element. For example:

```
<Request id="a1234" maxResults="50"
    xmlns:pcc='urn:oma:xml:xdm:cab:pcc''>
    <Keyword searchElem="pcc:last-name"
caseSensitive="yes">Jones</Keyword>
    </Request>...
```

The attribute 'searchElem' is of type QName and is optional. Thus, if omitted, a default of a search of any elem/field matching the supplied value would be performed.

A more complex search could be based on XQuery. The search could be based on specific criteria. The model allows users to perform searches based on specific criteria or parameters. For example:

```
<ContactSearch >
    <Request id="a5678" maxResults="10">
        <Query>
            <------XQuery CDATA search request goes here
        </Query>
    </Request>
</ContactSearch>
```

In the above, <ContactSearch> and <Request> are the same as in the simple search. The <Query> is an element that carries the search request data that is conforming to the W3C XQuery. The element is used to query network based address book systems for complex queries with specific criteria.

As a result of the search request, a response is received from address book server 320. The format of the response is as follows:

```
<ContactSearch>
    <Response id="a1234">
        <Result userId="x@example.com">X</Result>
        <Result userId="y@example.com">Y</Result>
    </Response>
    <Response id="a5678">
        <Result userId="bjones@example.com">
            <pcc:display-name>Bob "crazy-legs"
            Jones</pcc:display-name>
        </Result>
        <Result userId="mjones@foo.org">
            <pcc:display-name>Mary Jones</pcc:display-name>
        </Result>
    </Response>
</ContactSearch>
```

Where <Response> is a container element which contains the results from the search request from the server back to the client. This response element can contain one or more <Result> elements. In one embodiment the <Response> also contains the id attribute which corresponds to the input search request (of type NCName).

<Result> is an element that contains a single result based on the search request. For multiple results, a sequence of Result elements is generated by the server. This element contains the "userId" attribute, which indicates a unique identifier for the contact in the result. The type of <Result> is in a Uniform Resource Indicator (URI).

Referring again to FIG. 3, the figure, outlines a typical call-flow between an address book client (e.g. on a wireless device) and the corresponding address book server. It is assumed in these call flows, that the client is already authenticated and authorized against the corresponding address book server such as HTTP DIGEST, HTTPS authentication mechanisms, among others.

Address book client 310 can send either a complex or a simple search. The present disclosure is not meant to be limiting to the type of search that can be sent and in some cases address book client 310 could send a complex search in one instance and a simple search in a different instance.

In message 330, address book client 310 sends address book server 320 a contact search request with a keyword. As will be appreciated, this is a simple search from above. The format of the message 330 is an HTTP POST.

Thus, using message 330, the user makes a simple keyword "contact search" request to the server to obtain the matching results of the contact information at the server. The contact information accessible at the server can include the PCC of all the users of the address book system, address book data for all the users, and any external directories that the service provider wishes to expose to the search request. Such external directories can, for example, include the Yellow Pages™. Based on this user request, the address book client formulates a HTTP POST request to the server including the contact search XML document as the payload. Such a request could be:

```
POST /example.search/ HTTP/1.1
Host: example.com
User-Agent: Address Book-client/
Date: Thu, 11 Sep 2008 8:00:00 GMT
Accept-Encoding: gzip
Content-Type: application/vnd.ContactSearch+xml; charset="utf-8"
Content-Length: ...
<?xml version="1.0" encoding="UTF-8"?>
<ContactSearch xmlns="urn:xml:cab:search">
    <request id="a1234" maxResults="50">
        <Keyword caseSensitive="yes">example</Keyword>
    </request>
</ContactSearch>
```

This example includes HTTP header information along with an XML Payload showing a contact search request. The ContactSearch has a defined namespace and a schema.

In response, a message 340 is returned to address book client 310 from address book server 320. Message 340 contains the contact search response. The response includes a status code. The response also includes a payload in the body of the HTTP response. The search functions on the network may be performed by a contact search function, such as contact search function 220 from FIG. 2.

Thus message 340 is returned after address book server 320 receives the HTTP POST request from the client, at which point the server processes the request data in XML and performs the search operation against the applicable data sources, sending a response back to the client using an HTTP OK status including the search response data in XML containing a list of results matching the search keyword request:

```
HTTP/1.1 200 OK
Server: CAB-serv/OMA2.0
Date: Thu, 11 Sep 2008 8:00:05 GMT
Content-Type: application/vnd.ContactSearch+xml; charset="utf-8"
Content-Length: (...)
<?xml version="1.0" encoding="UTF-8"?>
<ContactSearch xmlns="urn:xml:cab:search">
    <Response id="a1234">
        <Result userId="x@example.com">X</Result>
        <Result userId="y@example.com">Y</Result>
    </Response>
</ContactSearch>
```

As indicated above with regard to the XML, as part of a successful search operation the response includes a list of results which includes a URI to the record of the contact information along with a display. Thus, for example, the display result could include a link to the URI if the user selects this contact, which could result in the device presenting additional information corresponding to the selected contact. An unsuccessful search operation could include various HTTP response codes, such as a 403/404 code if the user making the search is not authorized, for example.

Similarly, for a complex search, the address book client 310 sends a contact search request, which is an XQuery request as message 350 to address book server 320.

Message 350 is similar to message 330, with the exception that the user may send "contact search" request to the server based on a specific, more complex criteria. In this case, the request is formulated in XQuery format:

```
POST /example.search/ HTTP/1.1
Host: example.com
User-Agent: Address Book-client/
Date: Thu, 11 Sep 2008 8:15:00 GMT
Accept-Encoding: gzip
Content-Type: application/vnd.ContactSearch+xml; charset="utf-8"
Content-Length: ...
<?xml version="1.0" encoding="UTF-8"?>
<ContactSearch xmlns="urn:xml:cab:search">
                    <request id="a5678" maxResults="10">
    <Query>
        <![CDATA[
            xquery version "1.0";
            declare default element namespace
            "urn:oma:xml:xdm:cab:pcc"
            for $u in
            collection("org.openmobilealliance.cab.pcc/users/")/cab/pcc
                where ($u/last-name="Jones") and
                ($u/address/country="UK")
                return
                <Result>{$u/@userId}{$u/display-name}</Result>
        ]]>
    </Query>
                    </request>
</ContactSearch>
```

In the above, the XQuery looks for contacts with the last name Jones and address country of the UK. Again, an HTTP header with an XML payload is provided.

Message 360 is returned from Address book server 320, and is similar to message 340 in that the client receives a response after the server processes the request with a set of matching results, if any. A response could be:

```
HTTP/1.1 200 OK
Server: CAB-serv/OMA2.0
Date: Thu, 11 Sep 2008 8:00:05 GMT
Content-Type: application/vnd.ContactSearch+xml; charset="utf-8"
Content-Length: (...)
<?xml version="1.0" encoding="UTF-8"?>
<ContactSearch xmlns="urn:xml:CAB:search"
    xmlns:pcc="urn:xml:xdm:cab:pcc" >
                    <Response id="a5678">
                        <Result userId="bjones@example.com">
            <pcc:display-name>Bob "crazy-legs" Jones</pcc:display-name>
        </Result>
                        <Result userId="mjones@foo.org">
            <pcc:display-name>Mary Jones</pcc:display-name>
        </Result>
                    </Response>
</ContactSearch>
```

An exemplary XML schema for Contact Search payload is:

```
<?xml version="1.0" encoding="UTF-8"?>
<xs:schema targetNamespace="urn:xml:cab:search"
                xmlns="urn:xml:cab:search"
                xmlns:xs="http://www.w3.org/2001/XMLSchema"
                elementFormDefault="qualified">
    <!-- This import brings in the XML language attribute xml:lang-->
    <xs:import namespace="http://www.w3.org/XML/1998/namespace"
        schemaLocation="http://www.w3.org/2001/xml.xsd"/>
    <xs:element name="ContactSearch">
        <xs:complexType>
            <xs:choice>
                <xs:element maxOccurs="unbounded" ref="Request"/>
                <xs:element maxOccurs="unbounded" ref="Response"/>
            </xs:choice>
        </xs:complexType>
    </xs:element>
    <xs:element name="Request">
        <xs:complexType>
            <xs:choice>
                <xs:element name="Keyword"/>
                <xs:element ref="Query"/>
            </xs:choice>
            <xs:attribute name="id" use="required" type="xs:NCName"/>
            <xs:attribute name="maxResults" use="optional" type="xs:integer" default="50"/>
        </xs:complexType>
    </xs:element>
    <xs:element name="Keyword">
        <xs:complexType>
            <xs:simpleContent>
                <xs:extension base="xs:NCName">
                    <xs:attribute name="caseSensitive" use="optional" type="xs:boolean" default="false"/>
                    <xs:attribute name="searchElem" use="optional" type="xs:QName"/>
                </xs:extension>
            </xs:simpleContent>
        </xs:complexType>
    </xs:element>
    <xs:element name="Query" type="xs:string"/>
    <xs:element name="Response">
        <xs:complexType>
            <xs:sequence>
                <xs:element maxOccurs="unbounded" ref="Result"/>
            </xs:sequence>
```

```
            <xs:attribute name="id" use="required" type="xs:NCName"/>
        </xs:complexType>
    </xs:element>
    <xs:element name="Result" type="resultType"/>
    <xs:complexType name="resultType" mixed="true">
                    <xs:sequence>
                        <xs:any minOccurs="0"/>
                    </xs:sequence>
                    <xs:attribute name="userId" use="required" type="xs:anyURI"/>
        </xs:complexType>
    </xs:element>
</xs:schema>
```

The above therefore provides an interface for a Contact Search and illustrates a simple as well as a complex search request-response paradigm.

Contact Subscription

The contact subscription feature aims to allow a converged address book user to subscribe to other converged address book user's contact information. In other words, the feature allows a user to receive automatic updates of another converged address book user's available personal contact card information (PCC). The information from the contact subscription may be processed further to combine with the information that the converged address book user customizes about the associated contacts.

Figure 4:
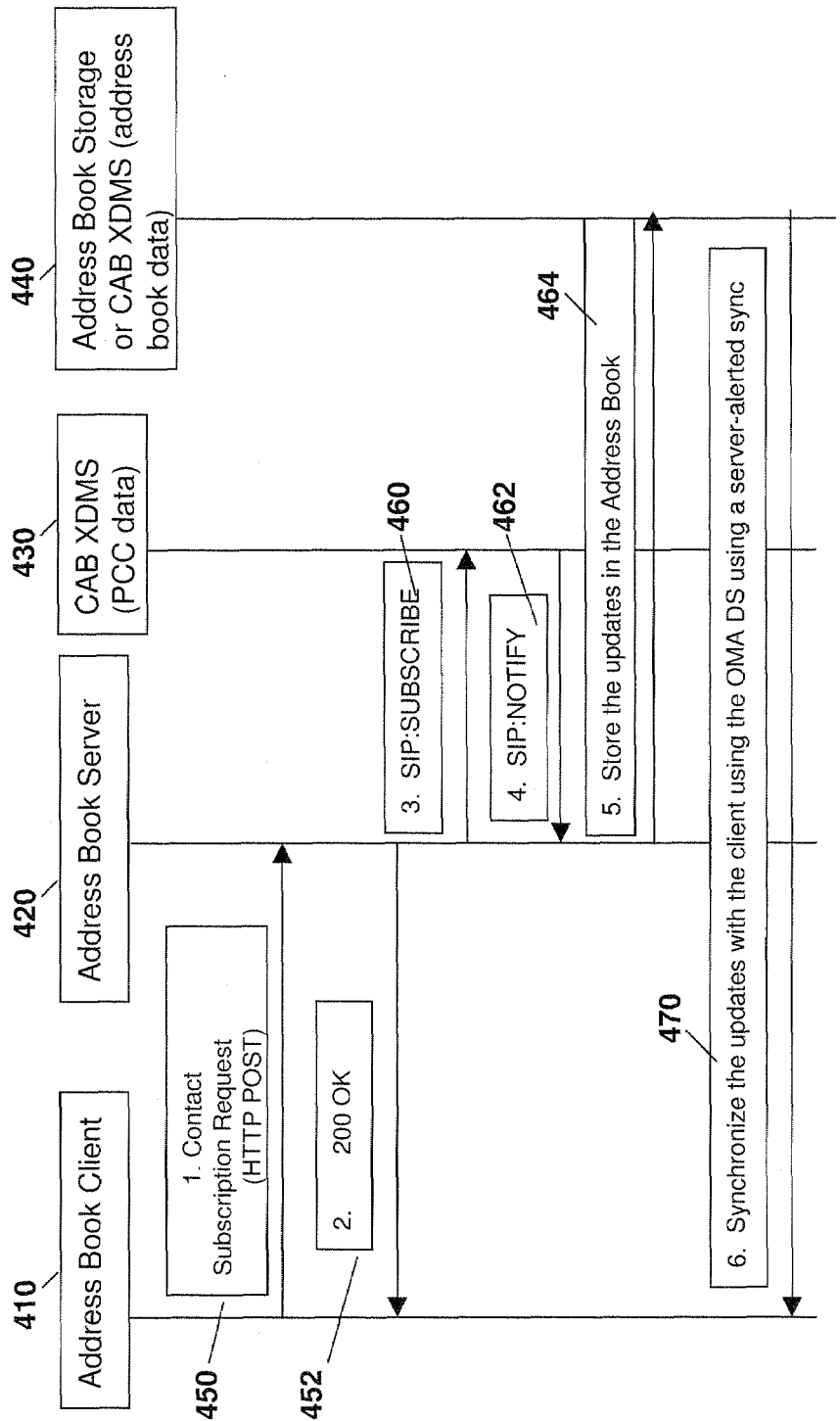
FIG. 4 is a flow diagram illustrating a contact subscription data flow.

Reference is now made to FIG. 4. A contact subscription takes the form:

```
<ContactSubscription>
        <--------------------- data for subscription request goes here.
</ ContactSubscription >
```

<ContactSubscription> is the root node of the contact subscription document which carries the subscription request. It is used to subscribe to other users' personal contact cards. The request includes a list of users and information that the user would like to subscribe to.

A subscription message may look like:

```
<ContactSubscription>
        <User identifier= "x@example.com" duration="86400"/>
        <User identifier= "y@example.com" duration="86400"/>
</ ContactSubscription >
```

In the above, <User> is an element within the <ContractSubscription> element that carries subscription requests for a user to be subscribed to. This element contains the various attributes.

A first attribute is 'Identifier': the identifier indicates a unique identification of a user which may be either an email address, SIP URI, AOR (address of record), or a LIST URI. The LIST URI is used to subscribe to a list or group of users at a single time. The type for this attribute is "Any URI".

'Duration' is a second attribute. This attribute indicates the maximum amount of time in seconds that the subscription is valid from the time of user request. The duration can be an integer value or, in one embodiment, a specific value could indicate an infinite time where the duration would not expire as long as the contact user was valid. The default value for "Duration" is '86400'.

A third attribute, not shown, may be a repository identifier to identify the repository the contact is in. The type for this attribute is "Any URI".

Referring to FIG. 4, an address book client 410 communicates with an address book server 420. Further, a personal contact card database such as an XDMS stores personal contact cards for all contacts within the system. This is represented by PCC XDMS 430. Further, an address book server 420 can communicate with address book storage 440 to store the updates resulting to contact subscription request from the user.

A message 450 is sent between address book client 410 and address book 420 indicating that the address book client 410 wishes to subscribe to a user. A contact subscription request can be made to one or more users of the network based address book system. Based on the request, the client formulates an HTTP POST request to the server including the contact subscription XML document as the payload.

An example of the HTML and XML for this request is:

```
POST /example.subscription/ HTTP/1.1
Host: example.com
User-Agent: Address Book-client/
Date: Thu, 11 Sep 2008 8:00:00 GMT
Accept-Encoding: gzip
Content-Type: application/vnd.ContactSubscription+xml; charset="utf-8"
Content-Length: ...
<?xml version="1.0" encoding="UTF-8"?>
<ContactSubscription xmlns="urn:xml:cab:subscription">
    <User identifier= "x@example.com" duration="86400"/>
    <User identifier= "y@example.com" duration="86400"/>
</ContactSubscription>
```

The above shows a contact subscription payload document with a defined namespace and attributes including user identifiers and subscription duration within an XML schema. The above is posted using an HTTP POST header.

Based on message 450, address book server 420 verifies the policies of the user to which the address book client 410 is trying to subscribe and if the policies allow such a subscription, a message 452 is returned to address book client 410. Thus the address book server 420 resolves the policies based on address book logic/requirements. The underlying XDMS is not relied on directly to enforce policy, as would be the case with an XDM client on the user equipment.

Message 452 includes an HTTP OK status which is sent in response to message 450. The subscription functions on the network may be performed by a contact subscription function, such as contact subscription function 222 from FIG. 2.

In message 460, address book server 420 communicates with the PCC XDMS 430. Message 460 represents a contact subscription request such as the contact subscription function within the server of a network to make a SIP:SUBSCRIBE request to the subscribed user's PCC located in the PCC XDMS.

In an alternative embodiment, address book server 420 could perform a direct fetch from PCC XDMS 430 and send a CAB-NOTIFY-in CAB client-form back to the client. A document synchronization notification framework can be used to do the notification or the address book server 420 can directly notify using SMS, MMS, email or SIP PUSH. This may occur where latency is to be reduced, for example in an immediate or high quality of service (QoS) type request. In this case, message 460 becomes an XDM HTTP GET and message 462 becomes an HTTP GET-RESP. The remaining messages 464 and 470 remain unchanged in the alternative embodiment.

At some future point, when information is updated for the subscribed user's information, PCC XDMS 430 pushes information or updates via SIP:NOTIFY to address book server 420, which is shown by message 462. Based on message 462, address book server 420 then stores the updates in the address book storage or CAB XDMS containing the address book data 440, as seen by message 464.

Alternatively, if the address book storage 440 has any 'intelligence', the address book server 420 could delegate the subscribe/fetch to it, and allow the address book storage 440 element or function to invoke the PCC XDMS directly. In that way message 464 is not required, since the address book storage 440 directly receives the SIP:NOTIFY or HTTP-GET RESP message 462 and thus can emit a DS Synchronization toward the address book client 410.

The address book storage or CAB XDMS containing the address book data 440 is then synchronized at some point with the local address book on address book client 410, as shown by synchronization 470. In one embodiment, synchronization is performed through a server-alert synchronization, wherein the server sends a notification to a user's device to initiate synchronization. The synchronization could be open mobile alliance data synchronization (OMA DS).

An exemplary XML schema for Contact Subscription payload is:

In particular, address book client 410 stores a contact subscription request 480 at CAB XDMS 432. The storing of the contact subscription request 480 results in an acknowledgement 482 indicating that the storage was successful. Message 482 indicates that the policies for CAB XDMS 432 allow such a subscription.

Subsequently address book server 420 retrieves the contact subscription request data, as shown by message 484. The retrieval of the contact subscription requests by the address book server can be done either using an XCAP GET operation or via SIP:NOTIFY based on a prior subscription to the request data in the CAB XDMS.

Subsequent to the retrieval at message 484, the process proceeds as described above with regard to FIG. 4. In particular, a subscription message 460 is sent to CAB XDMS 430 and message 462 is returned in response. Further, updates are stored in address book storage 440 as shown by message 464 and a synchronization occurs between address book storage 440 and address book client 410, as shown by message 470.

Figure 4A:
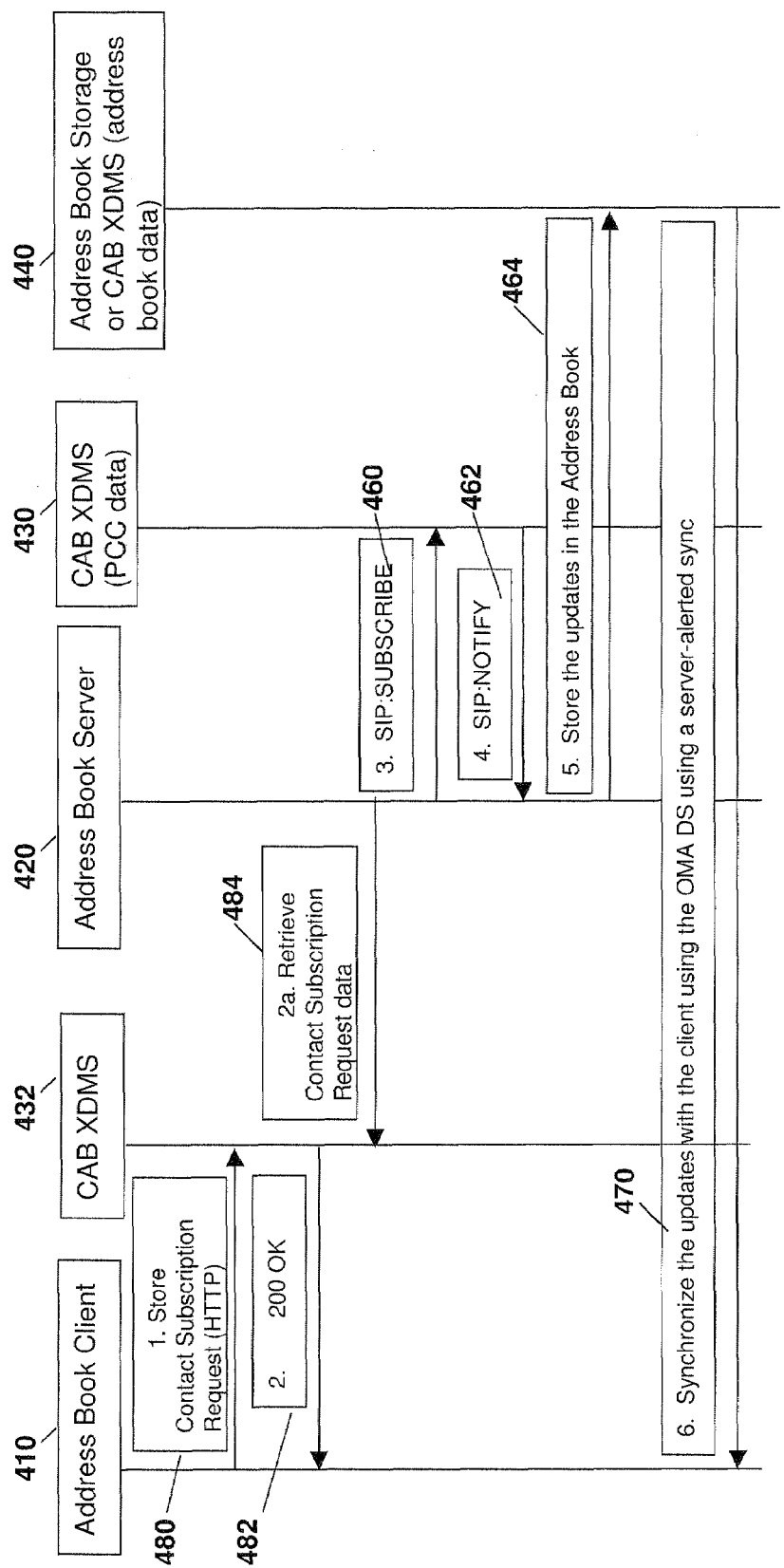
FIG. 4A is a flow diagram illustrating an alternative contact subscription data flow.

Thus, the embodiment of FIG. 4A shows an alternative having indirect communication between address book server 420 and address book client 410.

Contact Share

Contact Share functionality of the converged address book enabler aims to allow the converged address book user to share his or her contact information with other users through a messaging scheme. Such information can include the user's personal contact card, address book data, or both within the user's address book. The recipients of the information can be both converged address book users and also non-converged address book users.

```
<?xml version="1.0" encoding="UTF-8"?>
<xs:schema targetNamespace="urn:xml:cab:subscription"
            xmlns="urn:xml:cab:subscription"
            xmlns:xs="http://www.w3.org/2001/XMLSchema"
            elementFormDefault="qualified">
    <xs:element name="ContactSubscription">
        <xs:complexType>
            <xs:sequence>
                <xs:element maxOccurs="unbounded" ref="User"/>
            </xs:sequence>
        </xs:complexType>
    </xs:element>
    <xs:element name="User">
        <xs:complexType>
            <xs:attribute name="duration" use="optional" type="xs:integer" default="86400"/>
            <xs:attribute name="identifier" use="required" type="xs:anyURI"/>
        </xs:complexType>
    </xs:element>
</xs:schema>
```

The above therefore shows an interface for contact subscription.

In an alternative embodiment, the interface between address book client 410 and address book server 420 may be indirect. Reference is now made to FIG. 4A which utilizes CAB XDMS 432 for the indirect interface. In other embodiments, other proxies or databases may be utilized for the indirect interface.

In FIG. 4A, CAB XDMS 432 is added between address book client 410 and address book server 420. This database allows address book client to store requests and address book server 420 to retrieve the requests.

The structure for a contact share interface is as follows:

```
<ContactShare>
    <----------------------- data for contact share request goes here
</ContactShare>
```

In the above <ContactShare> is the root node of the contact share document that carries the contact share request from the user device. The request is used to share the user's own personal contact card or the information from the user's address book with other users who may be either part of the network based address book system or third party users.

For example, such third party users could include legacy users. The <ContactShare> element can contain either or both of the personal contact card or the contact entry elements.

In one embodiment, the <ContactShare> interface could utilize:

```
<ContactShare>
    <PCC>
        <User identifier= "x@example.com"/>
        <User identifier= "y@example.com"/>
    </PCC>
</ContactShare>
<ContactShare>
    <ContactEntry firstname="Joe" lastname= "Smith"
    tel="xxx-xxx-xxxx"
    email="joe.smith@example.com">
        <User identifier= "x@example.com"/>
        <User identifier= "y@example.com"/>
    </ContactEntry>
</ContactShare>
```

In the above, <PCC> is an element that includes that the user would like to share his or her own personal contact card information with other users. The PCC contains one or more <User> elements.

A <User> element is an element within the PCC element that indicates which other users the user would like to share his or her PCC information with. The element contains an "identifier" attribute that indicates the unique identifier of the recipient. The type of this attribute is "any URI" and may be any of an email address, SIP URI, AOR (address of record) or a LIST URI, among others. The LIST URI is used to share the PCC data with a list or group of users at a single time.

The <ContactEntry> element is an element that indicates that the user would like to share the entire or partial information from the contact entry of his or her address book with other users. It contains the following attributes.

A first attribute is "First name", which is an attribute that includes the first name of a user. This is an element of type "String".

A second attribute is "Last name", which is the last name of the user data. Again, the type is "String".

A third attribute is "tel", which is the telephone number of the user data. This is the type "Any URI".

A fourth attribute is "email", which is an email address of the user and is type "Any URI".

As will be appreciated, the above is not an exhaustive list of information within a contact entry and other elements could exist within the list. Alternatively, the <ContactEntry> element may contain a reference to the contact entry stored in the network address book of the user. This can be later used by the address book server to retrieve the contact entry information to be shared with other users.

Figure 5:
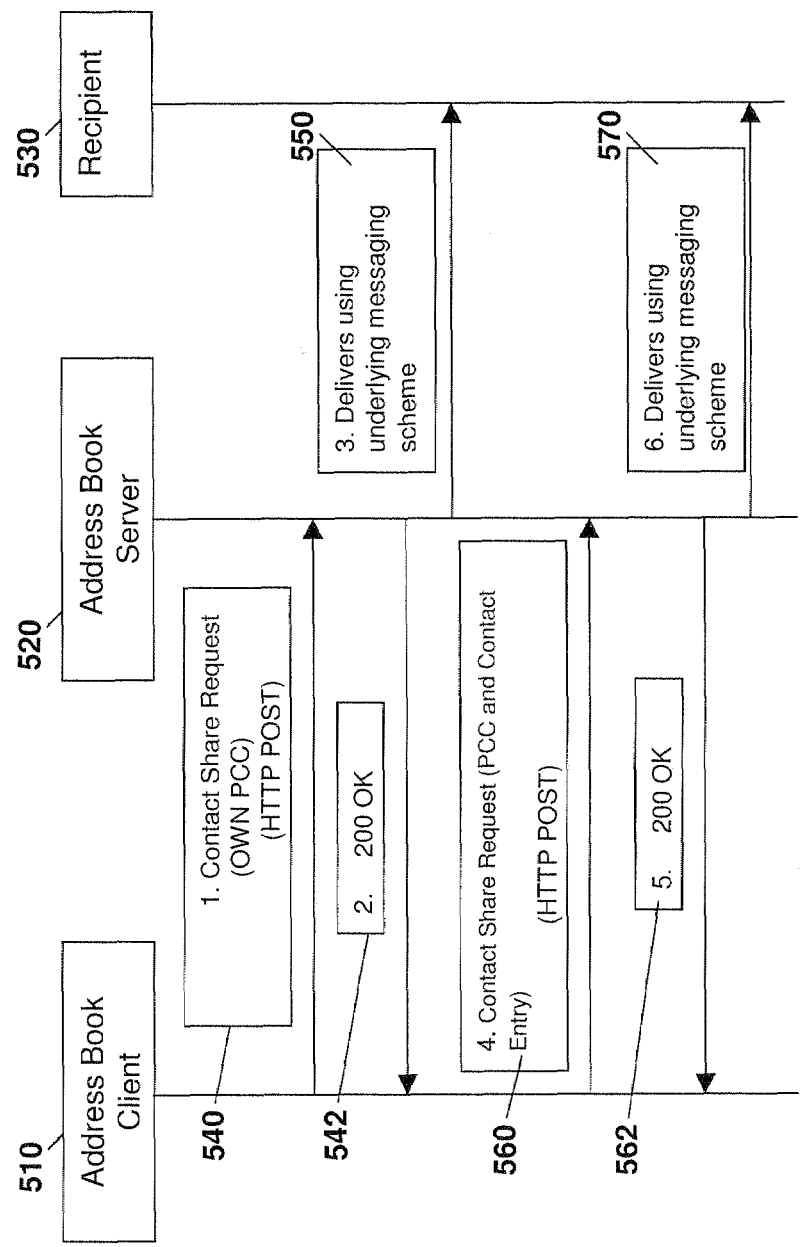
FIG. 5 is a flow diagram illustrating a contact share data flow.

Referring to FIG. 5, the figure illustrates a demonstrative call flow for a client address book, a network-based address book server (NAB) and a resulting recipient of the contact share(s). These are labeled as address book client 510, address book server 520 and recipient 530.

In message 540, the user makes a PCC contact share request to one or more users of the address book server 520. Based on the user request, address book client 510 formulates an HTTP POST request to the server including the contact share XML as payload. An example of the HTTP POST is:

```
POST /example.share/ HTTP/1.1
Host: example.com
User-Agent: Address Book-client/
Date: Thu, 11 Sep 2008 9:00:00 GMT
Accept-Encoding: gzip
Content-Type: application/vnd.ContactShare+xml; charset="utf-8"
Content-Length: ...
<?xml version="1.0" encoding="UTF-8"?>
<ContactShare xmlns="urn:xml:cab:share">
    <PCC>
        <User identifier= "x@example.com"/>
        <User identifier= "y@example.com"/>
    </PCC>
</ContactShare>
```

The message therefore includes HTTP POST headers and an XML payload that provides user identifiers for the targeted users with which the PCC is to be shared.

Based on message 540, address book server 520 sends a response. This is shown as message 542. Message 542 is a confirmation, for example an HTTP OK status, sent back to address book client 510.

Address book server 520 then delivers the contact to recipient 530 in message 550. As will be appreciated, the contact information sent in message 550 is received by address book server 520 from the PCC XDMS as part of the CAB XDMS 145 (not shown in the flow) and this PCC data is then delivered to recipient 530. The share functions on the network may be performed by a contact share function, such as contact share function 224 from FIG. 2. Alternatively, the PCC XDMS may send message 550 directly to the recipient 530 in one embodiment.

The delivery of message 550 depends on whether recipient 530 is a user of address book server 520 or not. For example, recipient 530 may be a user of a legacy format address book. In the case where recipient 530 is not a user of address book server 520, the contact information can be encoded in legacy format (for e.g. vCard) and sent through a messaging scheme such as email, short message service (SMS), multi-media message service (MMS), instant messaging service, among others. In another embodiment, it is possible to encode the message in another format (for e.g. hCard) and store the content offline, for later pickup by the recipient 530 using a WAP-PUSH message transported over SMS.

If recipient 530 is a user of address book server 520 then the contact information in message 550 is delivered internally within the address book system. For example, the PCC information may be stored directly in the address book of recipient 530.

Messages 540 and 550 are directed to the sharing of a client's own personal contact card. In a further embodiment, the client may also share contacts from the client's address book. Message 560 is used to share PCC and contact entries in the embodiment of FIG. 5. However, in other embodiments only the contract entries or the PCC alone could be shared.

Based on the user request, the address book client 510 formulates an HTTP POST request to address book server 520 including the contact share XML document as payload. Such a request could be:

```
POST /example.share/ HTTP/1.1
Host: example.com
User-Agent: Address Book-client/
Date: Thu, 11 Sep 2008 9:10:00 GMT
Accept-Encoding: gzip
Content-Type: application/vnd.ContactShare+xml; charset="utf-8"
Content-Length: ...
<?xml version="1.0" encoding="UTF-8"?>
<ContactShare xmlns="urn:xml:cab:share">
```

-continued

```
<PCC>
    <User identifier= "x@example.com"/>
    <User identifier= "y@example.com"/>
</PCC>
<ContactEntry firstname="Joe" lastname= "Smith"
tel="tel:+1-201-555-0123" email="joe.smith@example.com">
    <User identifier= "x@example.com"/>
``` of address book server 520. The information could be encoded for legacy systems if recipient 530 is not a user of address book server 520 and message 570 could then be delivered through a messaging scheme such as email, SMS or MMS, instant messaging service, among others. Conversely, if recipient 530 is a user of address book server 520 then the contact information can be delivered internally within the address book system.

An exemplary XML schema for Contact Share payload is:

```
<?xml version="1.0" encoding="UTF-8"?>
<xs:schema targetNamespace="urn:xml:cab:share"
           xmlns="urn:xml:cab:share"
           xmlns:xs="http://www.w3.org/2001/XMLSchema"
           elementFormDefault="qualified">
    <xs:element name="ContactShare">
        <xs:complexType>
            <xs:sequence>
                <xs:element ref="PCC" minOccurs="0"/>
                <xs:element ref="ContactEntry" maxOccurs="unbounded"/>
            </xs:sequence>
        </xs:complexType>
    </xs:element>
    <xs:element name="PCC">
        <xs:complexType>
            <xs:sequence>
                <xs:element maxOccurs="unbounded" ref="User"/>
            </xs:sequence>
        </xs:complexType>
    </xs:element>
    <xs:element name="ContactEntry">
        <xs:complexType>
            <xs:sequence>
                <xs:element maxOccurs="unbounded" ref="User"/>
            </xs:sequence>
            <xs:attribute name="email" use="optional" type="xs:anyURI"/>
            <xs:attribute name="firstname" use="optional" type="xs:string"/>
            <xs:attribute name="lastname" use="optional" type="xs:string"/>
            <xs:attribute name="tel" use="optional" type="xs:anyURI"/>
        </xs:complexType>
    </xs:element>
    <xs:element name="User">
        <xs:complexType>
            <xs:attribute name="identifier" use="required" type="xs:anyURI"/>
        </xs:complexType>
    </xs:element>
</xs:schema>
```

-continued

```
    <User identifier= "y@example.com"/>
    </ContactEntry>
</ContactShare>
```

The above therefore shows both a PCC request and a Contact Entry Request being shared in the XML payload. The contract entry in the above is "Joe Smith" and the information comes from the user's address book. The information is being shared with users having user identifiers x@example.com and y@example.com. Alternatively, if the contact entry contained a reference to the contact entry in the network-based address book, the address book server would retrieve this information based on the reference from the address book storage or CAB XDMS containing the address book data prior to sharing the data to the recipient.

In message 562, a response is sent to address book client 510. The response shows whether the address book server 520 successfully received and processed the request from message 560.

As with message 550, address book server 520 delivers the contact information to recipient 530 using a message 570. Message 570 is dependent on whether recipient 530 is a user The above therefore shows an interface for contact share.

In an alternative embodiment, contact share may also utilize an indirect interface between address book client 510 and address book server 520. In this regard, reference is made to FIG. 5A which utilizes CAB XDMS 532 for the indirect interface. In other embodiments, other proxies or databases may be utilized for the indirect interface.

Figure 5A:
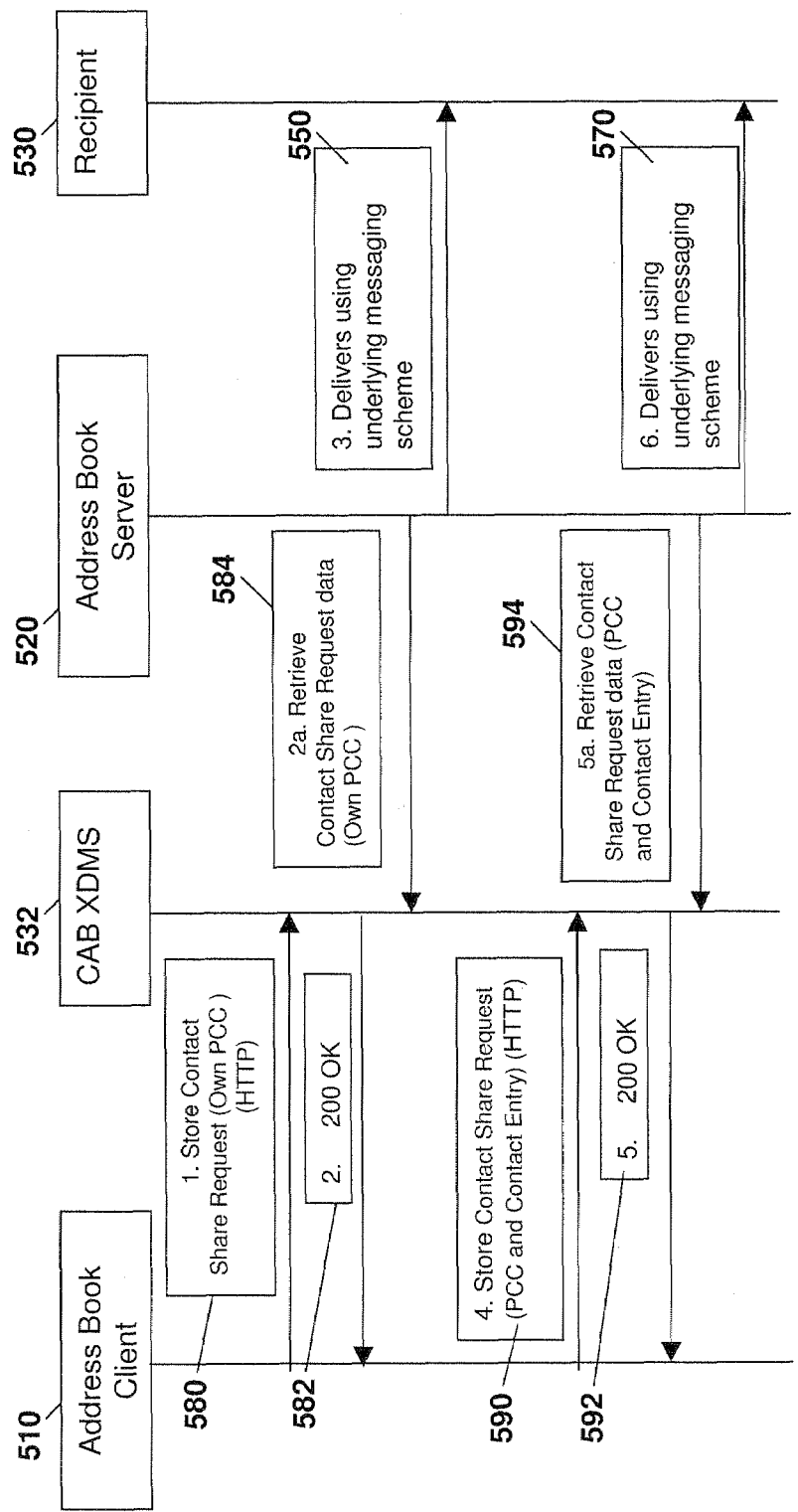
FIG. 5A is a flow diagram illustrating an alternative contact share data flow.

In FIG. 5A, CAB XDMS 532 is added between address book client 510 and address book server 520. Thus, rather than a contact share request 540, as made in the embodiment of FIG. 5, the address book client 510 stores contact share request 580 at CAB XDMS 532. If the policies on CAB XDMS 532 allow the contact share, message 582 is returned to address book client 510.

Subsequently, address book server 520 retrieves the contact share request, as shown by message 584 and subsequently delivers the message to recipient 530, as shown by message 550. The retrieval of the contact share requests by the address book server can be done either using an XCAP GET operation or via SIP:NOTIFY based on a prior subscription to the request data in the CAB XDMS.

A further contact share request may be stored, as shown by message 590, at CAB XDMS 532 by address book client 510. Message 590 contains both the contact card and contact entry similar to message 560 of FIG. 5.

In response to message 590, if the policies on CAB XDMS 532 allow contact sharing, a message 592 is returned to address book client 510.

Subsequently, address book server 520 retrieves the contact share request, as shown by message 594. This is then delivered to recipient 530, as shown by message 570. Again, the retrieval of the contact share requests by the address book server can be done either using an XCAP GET operation or via SIP:NOTIFY based on a prior subscription to the request data in the CAB XDMS.

Comparing FIGS. 5 and 5A, the functionality between the two is similar with the exception of the indirect interface.

Interaction with Legacy Address Book

The 'interaction with legacy address books' function aims to allow the converged address book enabler to interact with legacy systems. This allows the converged address book user to import data into the converged address book from other (non-CAB) address book data sources.

The interface for importing a legacy address book is:

```
<ImportLegacyAB>
    <---------------------- data for importing legacy AB request goes here
</ImportLegacyAB>
```

In the above, <ImportLegacyAB> is the root node of the import legacy address book request document which carries the user's request to import legacy address book data into the converged network-based address book. In order to import, a user should, in one embodiment, specify the domain or service identifier of the address book and necessary user credentials to allow the server to obtain the address book on behalf of the user. An example is:

```
<ImportLegacyAB>
    <Domain> mail.example.com
        <Credentials>
            <Username>A@example.com</Username>
            <Password>******</Password>
        </Credentials>
        <DataSource id="foo"/>
    </Domain >
    <Domain> mail.example1.com
        <Credentials>
            <Username>B@example1.com</Username>
            <Password>******</Password>
        </Credentials>
        <DataSource id="the:quick:brown:fox"/>
    </Domain >
</ImportLegacyAB>
```

<Domain> is an element under <ImportLegacyAB> which contains domain specific information such as a domain name or service identifier of the legacy address book system that the user would like to import address book data from. The data of this element is of type "domainType". It may contain one <Credentials> element and zero or more <DataSource> elements. The root <ImportLegacyAB> element can contain one or more <Domain> elements.

<Credentials> is an element within the <Domain> element that consists of the following elements corresponding to the user credentials. <UserName> is an element containing the user name of the user to access the legacy address book. This element has the type "any URI". <Password> is an element which contains the password of the user to access the legacy book. The type of this element is "token". <DataSource> is an optional sub-element of element <Domain> which contains the data source to import from. This element has an optional attribute "ID" that identifies the data source to import. In one embodiment, the CAB client could use a URI to select where to import a legacy address book from, and the CAB server could, assuming it is provisioned with this information, do the importation.

Alternatively, a given 'domain' or 'third-party' could be provisioned into the CAB server, for example using a management object (MO) or device management (DM) object. Thus the CAB service provider could provision the information on behalf of all CAB users. In this way, the server acts on behalf of a given client to act on the third party address book.

Figure 6:
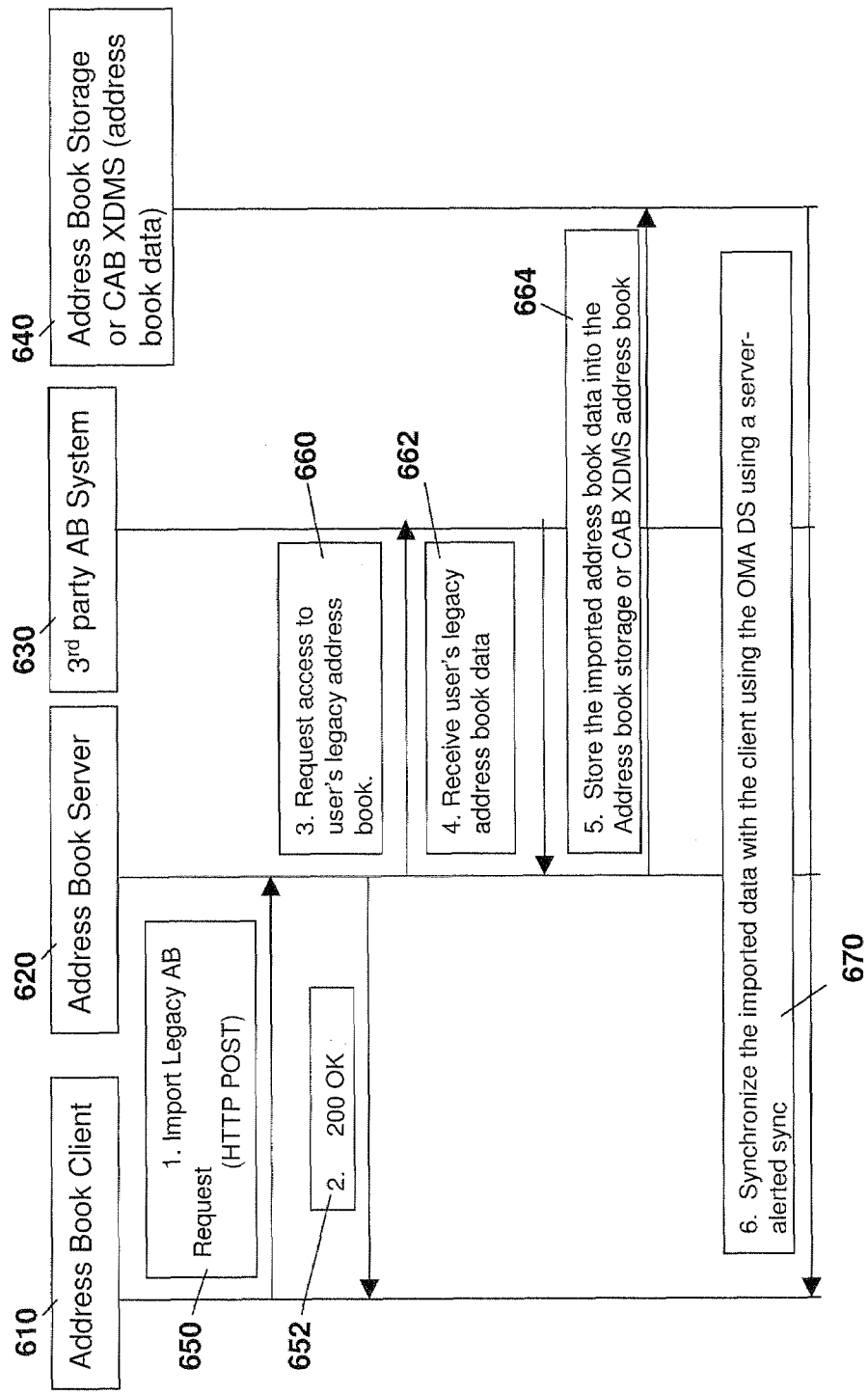
FIG. 6 is a flow diagram illustrating an interaction with legacy address book data flow.

Reference is now made to FIG. 6. An address book client 610 communicates with address book server 620, which in-turn communicates with a third party address book system 630.

Address book server 620 further communicates with an address book storage 640 for a particular user.

In message 650 a user makes an "import legacy AB" request to the address book server 620. Based on the user request, address book client 610 formulates an HTTP POST request to the server including the 'ImportLegacyAB' XML document as the payload. An example is:

```
POST /example.import/ HTTP/1.1
Host: example.com
User-Agent: Address Book-client/
Date: Thu, 11 Sep 2008 10:00:00 GMT
Accept-Encoding: gzip
Content-Type: application/vnd.ImportLegacyAB+xml; charset="utf-8"
Content-Length: ...
<?xml version="1.0" encoding="UTF-8"?>
<ImportLegacyAB xmlns="urn:xml:cab:import">
        <Domain> mail.example.com
            <Credentials>
                <Username>A@example.com</Username>
                <Password>******</Password>
            </Credentials>
        <DataSource id="foo"/>
        </Domain>
</ImportLegacyAB>
```

In response, message 652 is sent back to address book client 610. Message 652 indicates whether the server received the request and processed it successfully.

Subsequently, the address book server 620, on behalf of a user, requests access to third party address book system 630, as shown in message 660. The user credentials are supplied to third party address book system 630 to ensure access. The interaction with legacy address book functions on the network may be performed by a function, such as interworking function 224 from FIG. 2.

In response to the request in message 660, third party address book system 630 responds with message 662. Message 662 includes the legacy address book data of the user from the third party address book system.

Address book server 620 then stores the imported address book into address book storage 640, as shown as message 664. As will be appreciated, this may involve mapping data from third party address book system 630 to a format acceptable for address book storage or CAB XDMS containing the address book data 640.

The data in the address book storage or CAB XDMS containing the address book data 640 is, at some later point, synchronized with the address book on the user device, as shown by synchronization 670. Synchronization is performed through a server-alerted synchronization in one embodiment, wherein the server sends a notification to a user device to initiate synchronization. This demonstrates synchronization utilizing OMA DS.

An exemplary XML schema for Import legacy address book payload is:

```xml
<?xml version="1.0" encoding="UTF-8"?>
<xs:schema targetNamespace="urn:xml:cab:import"
           xmlns="urn:xml:cab:import"
           xmlns:xs="http://www.w3.org/2001/XMLSchema"
           elementFormDefault="qualified">
    <xs:element name="ImportLegacyAB">
        <xs:complexType>
            <xs:sequence>
                <xs:element maxOccurs="unbounded" ref="Domain"/>
            </xs:sequence>
        </xs:complexType>
    </xs:element>
    <xs:element name="Domain" type="domainType"/>
    <xs:complexType name="domainType" mixed="true">
        <xs:sequence minOccurs="0" maxOccurs="unbounded">
            <xs:element ref="Credentials" maxOccurs="1"/>
            <xs:element ref="DataSource" minOccurs="0"/>
        </xs:sequence>
    </xs:complexType>
    <xs:element name="Credentials">
        <xs:complexType>
            <xs:sequence>
                <xs:element name="Username" type="xs:anyURI"/>
                <xs:element name="Password" type="xs:token"/>
            </xs:sequence>
        </xs:complexType>
    </xs:element>
    <xs:element name="DataSource">
        <xs:complexType>
            <xs:attribute name="id" use="optional" type="xs:NMTOKEN"/>
        </xs:complexType>
    </xs:element>
</xs:schema>
```

In an alternative embodiment, a proxy may be used for interactions between address book client 610 and address book server 620. In this regard reference is made to FIG. 6A, in which a CAB XDMS 632 is added.

Figure 6A:
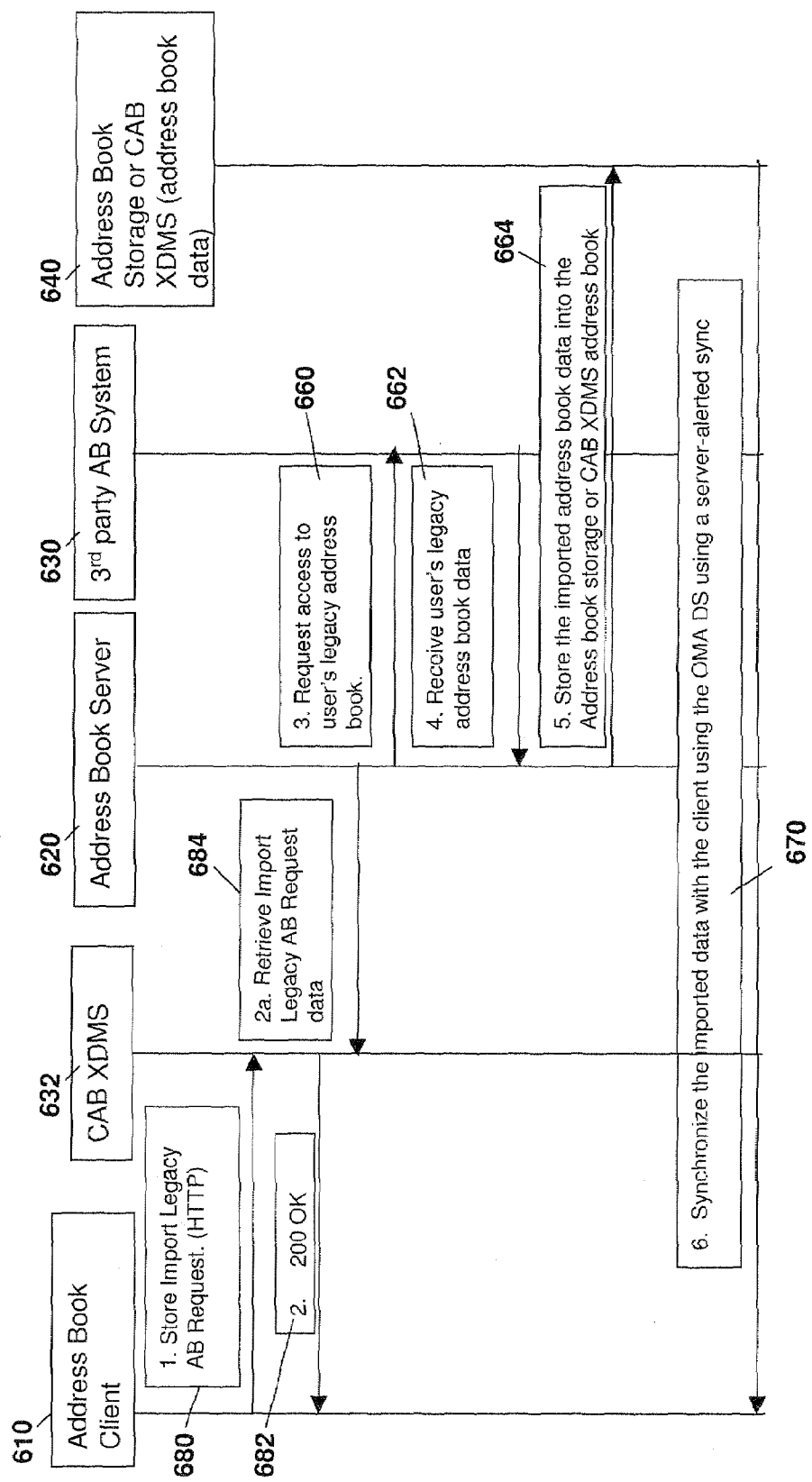
FIG. 6A is a flow diagram illustrating an alternative interaction with legacy address book data flow.

In the embodiment of FIG. 6A, message 650 from FIG. 6 is replaced with message 680 in which the import legacy address book request is stored in CAB XDMS 632, as shown by message 680. In response, a message 682 is sent from CAB XDMS 632 to address book client 610 indicating the request data is successfully placed in the CAB XDMS 632.

In message 684, address book server 620 retrieves the import legacy address book request data from CAB XDMS 632. The retrieval of the import legacy address book request data by the address book server can be done either using an XCAP GET operation or via SIP:NOTIFY based on a prior subscription to the request data in the CAB XDMS. The remaining messages from FIG. 6 above remain the same. In particular, address book server 620 sends a request to access a user's legacy address book in message 660, receives the user's legacy address book data in message 662, stores the imported address book data in an address book storage 640, as shown by message 664 and performs a synchronization between address book client 610 and address book storage 640, as shown by message 670.

Thus, the interface between address book client 610 and address book server 620 may be direct or indirect.

The above therefore illustrates an interface for importing legacy address book information.

The present disclosure thus provides methods and systems to define an interface between a mobile device and the network-based address book (NAB) system to communicate and access information from the network-based converged address book system to the mobile device. This interface provides a consistent method to access and communicate necessary requests from the mobile device to the network-based address book.

As will be appreciated, the above can be implemented on any user device. If the user device is a mobile device, one exemplary mobile device is described below with reference to FIG. 7. This is not meant to be limiting, but is provided for illustrative purposes.

Figure 7:
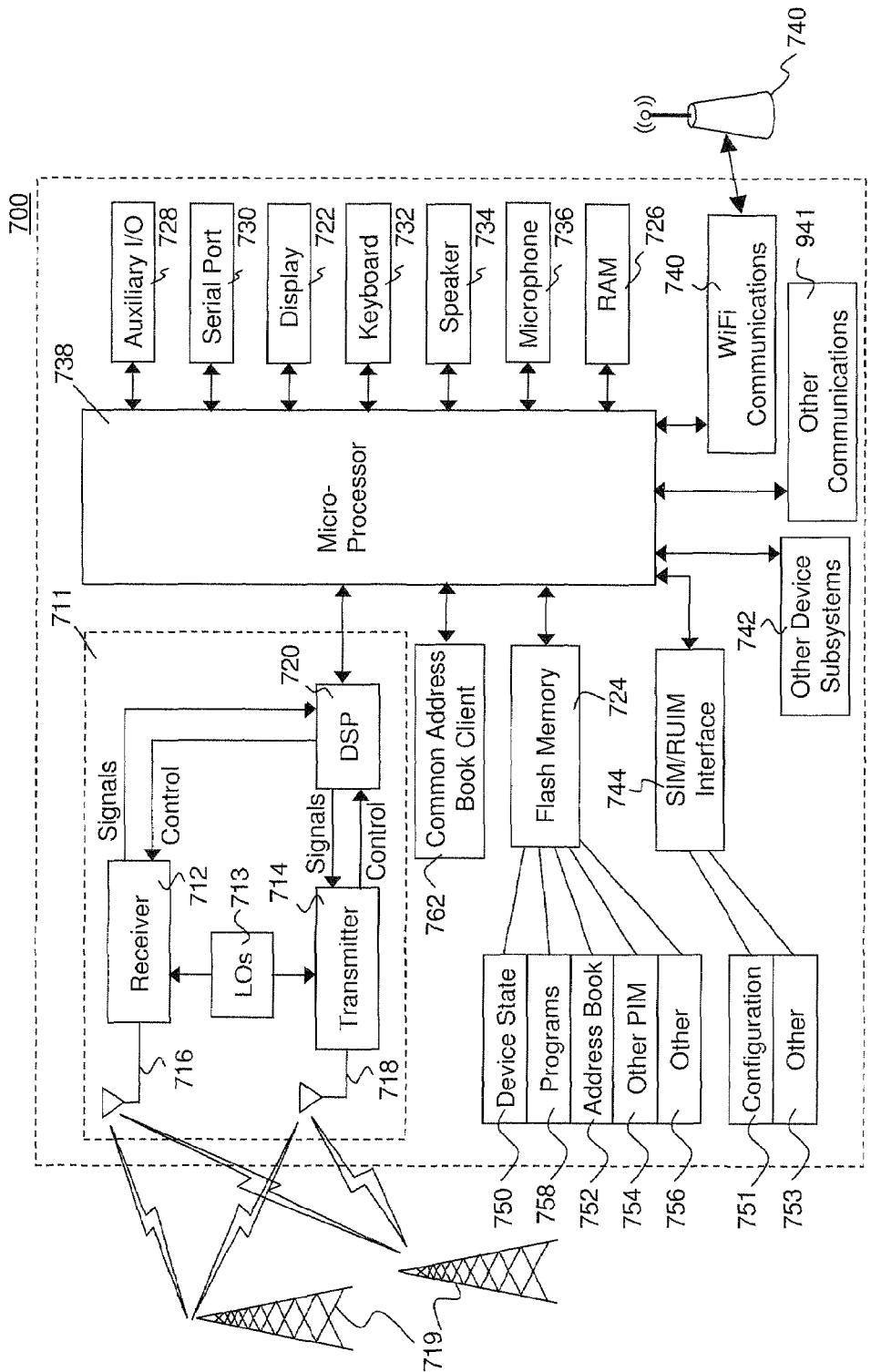
FIG. 7 is a block diagram of an exemplary mobile device.

FIG. 7 is a block diagram illustrating a mobile device apt to be used with preferred embodiments of the apparatus and method of the present application. Mobile device 700 is preferably a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some CDMA/UMTS networks network access is associated with a subscriber or user of mobile device 700. A mobile device may require a removable user identity module (RUIM) or a subscriber identity module (SIM) card in order to operate on a network. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile device 700 may send and receive communication signals over the network 719. As illustrated in FIG. 7, network 719 can consist of multiple base stations communicating with the mobile device.

Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. ND conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on mobile device 700 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the microprocessor 738, which preferably further processes the received signal for element attributes for output to the display 722, or alternatively to an auxiliary I/O device 728.

A user of mobile device 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals would preferably be output to a speaker 734 and signals for transmission would be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

WiFi Communications Subsystem 740 is used for WiFi Communications and can communication with access point 140.

Other communications subsystems 741, such as a short-range communications subsystem, is a further component which may provide for communication between mobile device 700 and different systems or devices, which need not necessarily be similar devices. For example, the subsystem 741 may include an infrared device and associated circuits and components or a Bluetooth™ communication module to provide for communication with similarly enabled systems and devices.

CAB Client 762 could interact with processor 738. Further, the OMA DS Client could exist with the programs 758 on device 700.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method performed by an address book server for importing legacy address book data, the method comprising:
   receiving at an address book server a first request, transmitted via an XML document management server (XDMS), from an address book client to import user-information from a third party non-converged address book system, wherein receiving the first request is in response to the address book server sending an XML Configuration Access Protocol (XCAP) GET to the XDMS;
   sending from the address book server a second request, in response to the first request, to access the user-information from the third party non-converged address book system, wherein the second request comprises a domain element that identifies the third party non-converged address book system;
   receiving at the address book server user address book data based on the second request;
   sending from the address book server the received user address book data for storage; and
   sending from the address book server to the address book client a notification to trigger a synchronization between the address book client and the storage.

2. The method of claim 1, wherein the domain element includes at least a user name and a user password for accessing the user information from the third party non-converged address book system.

3. The method of claim 1, further comprising sending a notification to a user device executing the address book client to initiate synchronization, wherein the notification is sent subsequent to receiving user address book data.

4. The method of claim 1, wherein the second request is in an HTTP POST format.

5. The method of claim 1, wherein the storage is on a Converged Address Book XML Document Management Server Component (CAB XDMS).

6. An address book server comprising:
   non-transitory memory; and
   a hardware processor, the hardware processor configured to:
      receive at an address book server a first request, transmitted via an XML document management server (XDMS), from an address book client to import user-information from a third party non-converged address book system, wherein receiving the first request is in response to the address book server sending an XML Configuration Access Protocol (XCAP) GET to the XDMS;
      send from the address book server a second request, in response to the first request, to access the user-information from the third party non-converged address book system, wherein the second request comprises a domain element that identifies the third party non-converged address book system;
      receive at the address book server user address book data based on the second request;
      send from the address book server the received user address book data for storage; and
      send from the address book server to the address book client a notification to trigger a synchronization between the address book client and the storage.

7. The address book server of claim 6, wherein the domain element includes at least a user name and a user password for accessing the user information from the third party non-converged address book system.

8. The address book server of claim 6, wherein the processor is further configured to send a notification to a user device executing the address book client to initiate synchronization, wherein the notification is sent subsequent to receiving user address book data.

9. The address book server of claim 6, wherein the second request is in an HTTP POST format.

10. The address book server of claim 6, wherein the storage is on a Converged Address Book XML Document Management Server Component (CAB XDMS).

11. A non-transitory computer readable medium storing instructions which causes a network component to execute a converged address book server configured to perform the operations of:
   receiving at an address book server a first request, transmitted via an XML document management server (XDMS), from an address book client to import user-information from a third party non-converged address book system, wherein receiving the first request is in response to the address book server sending an XML Configuration Access Protocol (XCAP) GET to the XDMS;
   sending from the address book server a second request, in response to the first request, to access the user-information from the third party non-converged address book system, wherein the second request comprises a domain element that identifies the third party non-converged address book system;
   receiving at the address book server user address book data based on the second request;
   sending from the address book server the received user address book data for storage; and
   sending from the address book server to the address book client a notification to trigger a synchronization between the address book client and the storage.

12. The non-transitory computer readable medium of claim 11, wherein the domain element includes at least a user name and a user password for accessing the user information from the third party non-converged address book system.

13. The non-transitory computer-readable medium of 11, further configured to perform the operation of sending a notification to a user device executing the address book client to initiate synchronization, wherein the notification is sent subsequent to receiving user address book data.

14. The non-transitory computer-readable medium of claim 11, wherein the second request is in an HTTP POST format.

15. The non-transitory computer-readable medium of claim 11, wherein the storage is on a Converged Address Book XML Document Management Server Component (CAB XDMS).

\* \* \* \* \*